United States Patent [19]
Boyer et al.

[11] 3,718,628
[45] Feb. 27, 1973

[54] VULCANIZATION OF ETHYLENE-PROPYLENE-DIENE TERPOLYMERS

[75] Inventors: Jackson S. Boyer, Wilmington, Del.; Richard D. Cassar, West Chester, Pa.

[73] Assignee: Sun Oil Company, Philadelphia, Pa.

[22] Filed: June 23, 1970

[21] Appl. No.: 49,177

[52] U.S. Cl. ......260/79.5 B, 260/557 H, 260/558 H, 260/561 H, 260/785, 260/793, 260/794
[51] Int. Cl. ..........................C08f 27/07, C08d 9/00
[58] Field of Search .....260/79.5 B, 785, 795, 557 H, 260/558 H, 561 H, 775

[56] References Cited

UNITED STATES PATENTS

| | | | |
|---|---|---|---|
| 2,851,507 | 9/1958 | St. John, Jr. | 260/780 |
| 3,308,103 | 3/1967 | Coran | 260/79.5 |
| 3,400,106 | 9/1968 | Morita | 260/79.5 |

OTHER PUBLICATIONS

Nischk, G., Chem. Abst., 54, 20, 340 h.

*Primary Examiner*—James A. Seidleck
*Assistant Examiner*—C. A. Henderson, Jr.
*Attorney*—George L. Church, Donald F. Johnson and Wilmer E. McCorquodale, Jr.

[57] ABSTRACT

Ethylene-propylene-diene terpolymer elastomer compositions having improved vulcanization properties containing auxiliary vulcanization accelerators selected from mono and dihydrazide derivatives of monobasic and dibasic organic acids containing $C_2$ to $C_{40}$ carbon atoms and having alkyl, aryl, alkenyl and cyclic structures.

14 Claims, No Drawings

VULCANIZATION OF ETHYLENE-PROPYLENE-DIENE TERPOLYMERS

CROSS REFERENCES TO RELATED APPLICATIONS

The present application is related to copending application Ser. No. 49,176 by Anne R. Donnell which discloses as new compositions of matter the mono and dihydrazide derivatives of certain methylated muconic acids which are effective in the improvement of viscosity stability of synthetic elastomers. This application is also related to our copending application Ser. No. 49,179 which discloses as new compositions of matter mono and dihydrazides of naphthalene dicarboxylic acids which have been found suitable for use in viscosity stability improvement of synthetic elastomer compositions. This application is also related to our copending application Ser. No. 49,178 which discloses synthetic elastomers having improved resistance to viscosity breakdown when extended with petroleum hydrocarbon oils and containing dihydrazides of monobasic and dibasic organic acids containing $C_2$ to $C_{40}$ carbon atoms. All of these corelated applications are of common ownership and have been filed of even date herewith.

BACKGROUND OF THE INVENTION

The problems related to the vulcanization of elastomers are many and complex. U.S. Pat. No. 1,418,825 to Ralph B. Naylor issued June 6, 1922 discloses the use of phenylhydrazine to accelerate the vulcanization of natural rubber. U. S. Pat. No. 2,851,507 to Willerd N. St. John, Jr. et al. issued Sept. 9, 1958 discloses the addition of mono and dihydrazides of monobasic and dibasic organic acids to natural rubber to inhibit scorch during vulcanization preparation of natural rubber. Specifically, it is generally known that vulcanization accelerators when employed in the manufacture of natural rubber products often resulted in precuring or prevulcanization of the raw natural rubber composition. This precuring or prevulcanization is known as scorching. When premature cross-linking (scorching) occurred in the rubber being processed, the step of forming the rubber into its ultimate useful shape was very difficult. Thus it was disclosed that the addition of hydrazides to a natural rubber composition delayed or inhibited scorching and thereby improved the processability of natural rubber. Thus St. John et al. teaches that the addition of the dihydrazides and monohydrazides of monobasic and dibasic organic acids retards scorching of natural rubber compositions during the vulcanization process.

With the advent of synthetic polymers, it has been discovered that the vulcanization process in general and curing additives in particular must be tailored to the particular chemical make-up of each synthetic elastomer being treated. For example, the curing of styrene-butadiene polymer requires one set of processing conditions and a specific set of vulcanization agents, whereas ethylene-propylene copolymer elastomer normally cannot be easily cured under the same processing conditions and with the same vulcanization agents as those disclosed for the styrene-butadiene polymer. Thus it has been found that the art of vulcanization of synthetic elastomers is at best unpredictable and each of the elastomers must be provided for in accordance with its own requirements.

One of the most interesting recent advances in rubber technology is the development of ethylene-propylene terpolymers. This new class of elastomer polymers is comprised normally of three monomers which include ethylene, propylene and a third diene monomer (EPDM). The added third monomer which is a diene provides the ethylene-propylene copolymer with the advantage of being sulfur vulcanizable. Coincidentally, with the advent of these new terpolymers is the need for the development of a process to vulcanize these new terpolymer compositions to provide a synthetic elastomer of superior physical characteristics.

One of the significant problems encountered in attempting to vulcanize ethylene-propylene-diene polymers (EPDM) is the slow rate of cure normally associated with these polymers. Contrary to the experience found with natural rubber, ethylene-propylene-diene polymers suffer little from scorch. To the contrary, the polymers cure so slowly that commercial manufacturing is economically questionable because of the extensive time of vulcanization.

Several of the well known vulcanization accelerators have been used with EPDM polymers. However, the use of the known vulcanization accelerators with these new elastomers has met with only limited success. A new class of auxiliary accelerators particularly suitable for use with EPDM polymers has now been discovered.

DESCRIPTION OF THE INVENTION

It has now been discovered that the hydrazide derivatives of both monobasic and dibasic organic acids having from 2 to 40 carbon atoms when added to sulfur vulcanizable ethylene-propylene-diene terpolymers (EPDM) in combination with sulfur containing primary and secondary curing additives substantially accelerate the curing process.

The EPDM polymer synthetic elastomers of the present invention include copolymers of ethylene and propylene and a third unconjugated diene monomer including such polymers as ethylene-propylene-1,4-hexadiene; ethylene-propylene-dicyclopentadiene; ethylene-propylene-5-methylene-2-norbornene; ethylene-propylene-1,5-cyclooctadiene; ethylene-propylene-allene and others. These terpolymers are well known standard articles of commerce. Methods of preparing the EPDM polymers included in the compositions of the present invention are disclosed in U.S. Pat. No. 2,933,480 issued Apr. 19, 1960; U.S. Pat. No. 3,000,866 issued Sept. 19, 1961; U.S. Pat. No. 3,063,973 issued Nov. 13, 1962; U.S. Pat. No. 3,093,620 issued June 11, 1963; U.S. Pat. No. 3,093,621 issued June 11, 1963; U.S. Pat. No. 3,260,708 issued July 12, 1966; U.S. Pat. No. 3,310,537 issued Mar. 21, 1967 and others.

Examples of EPDM elastomers and vulcanizing systems are disclosed in "Development Products Report No. 20 on NORDEL Hydrocarbon Rubber," a technical report by E. I. duPont de Nemours and Company, Inc. (May 1963). Suitable primary and secondary accelerators for vulcanization of EPDM elastomers are also disclosed in "The Vanderbuilt Rubber Handbook" ed. by George G. Winspear, R. T. Vanderbuilt Company, Inc.., N.Y., N.Y. (1968), pages 70–74.

Examples of sulfur containing primary accelerators normally used in vulcanization of EPDM elastomers include:

Tetramethylthiuram disulfide

Tetraethylthiruam disulfide
Dipentamethylenethiuram hexasulfide
Tetramethylthiruam monosulfide
Dimethylthiourea
Examples of secondary sulfur containing accelerators normally used in vulcanization of EPDM elastomers include:
Benzothiazolyl disulfide
2-mercaptobenzothiazole
N-oxydiethylene benzothiazole-2-sulfenamide
N-cyclohexyl-2-benzothiazolesulfenamide
Sodium 2-mercaptobenzothizole
Zinc 2-mercaptobenzothiazole
2,2'-dithiobisbenzothiazole
2-(morpholinothio)-benzothiazole
2-benzothiazolyl 1-hexamethyleniminecarbodithioate
2-benzothiazolyl-thiolbenzoate
1,3-bis(2-benzothiazolylmercaptomethyl) urea
2-(2,4-dinitrophenylthio) benzothiazole
S(2-benzothiazolyl) N,N-diethyl dithiocarbamate
N-cyclohexylbenzothiazole-2-sulfenamide
N-tert-butylbenzothiazole-2-sulfenamide A typical example of a formulation of a vulcanizable EPDM elastomer composition comprises:

| | |
|---|---|
| NORDEL 1070 EPDM | 100.0 Parts by Weight |
| Zinc Oxide | 5.0 Parts by Weight |
| Tetramethylthiuram Monosulfide | 1.5 Parts by Weight |
| Mercaptobenzothiazole | 0.5 Parts by Weight |
| Sulfur | 1.5 Parts by Weight |
| HAF Carbon Black | 50.0 Parts by Weight |
| Process Oil | 20.0 Parts by Weight |

This formulation provides an EPDM elastomer having an optimum cure after approximately 22 minutes at 320° F. By the methods and compositions of the present invention, the time to optimum cure is substantially reduced.

The compositions of the present invention contain a new auxiliary secondary accelerator which when added to the presently used vulcanization formulas for curing EPDM elastomer provides a cured elastomer compositions in a substantially reduced amount of time.

The class of compounds suitable as auxiliary accelerators for vulcanization of EPDM polymers in accordance with the methods and compositions of the present invention can be defined as mono and dihydrazides of monobasic and dibasic organic acids having the general structural formula

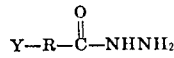

wherein Y is selected from

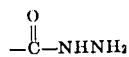

and hydrogen, R is a divalent $C_1$ to $C_{40}$ hydrocarbon radical. The R group in the above disclosed structural formula can be a $C_1$ to $C_{40}$ divalent hydrocarbon radical which can be aryl, alkyl, alkenyl and cyclic in structure. Although both the monohydrazides and dihydrazides of the above disclosed organic acids are effective in improving the vulcanization of EPDM synthetic elastomeric compositions, the monohydrazide derivatives of monobasic organic acids are the preferred additives.

The auxiliary accelerators of the present invention can be of the structural formula

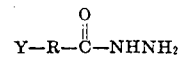

wherein Y is selected from

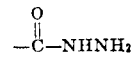

and hydrogen, and R can be a divalent $C_1$ to $C_{40}$ hydrocarbon alkyl. Compounds wherein Y is

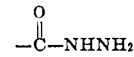

can include the dihydrazides of dibasic acids such as:
Malonic Acid
Succinic Acid
Glutaric Acid
Adipic Acid
Pimelic Acid
Suberic Acid
Azeloic Acid
Sebacic Acid
Bassylic Acid
Pentadecanedioic Acid
Eicosandioic Acid
Tricosandioic Acid
Triacontanedioic Acid
Heptatriacontanedioic Acid
Tetracontanedioic Acid Compounds in which Y is hydrogen can include the monohydrazides of
Acetic Acid
Propionic Acid
Butyric Acid
Valeric Acid
Caproic Acid
Enanthic Acid
Caprylic Acid
Pelargonic Acid
Capric Acid
4,4-dimethyloctanoic Acid
n-Stearic Acid
Cerotic Acid
n-triacontanic Acid
Hexatriacontanic Acid
n-Tetracontanic Acid
Eicosanedioic Acid
n-tetracontanedioic Acid Each of the monobasic and dibasic organic acid hydrazides disclosed above and hereafter can be obtained by reacting a solution of the respective acid with a stoichiometric quantity of hydrazine in solution at a temperature in the range of 50° to 210° F. Thereafter the desired hydrazide derivative can be recovered by procedures such as solvent extraction or recrystallization, methods well known to those skilled in the art. The preferred method of preparing hydrazides utilizes the mono and diester of the acid as a starting material.

As an illustration of one method of preparing the dihydrazide derivative of a dibasic acid, a 400 milliliter solution of methanol containing 35 grams of the dimethyl ester of succinic acid dissolved therein was admixed with 200 milliliters of methanol containing 35 grams of dissolved hydrazine hydrate. The solution was agitated for 1 hour at a temperature of 104° F. and thereafter permitted to cool to room temperature. After 96 hours a white crystalline precipitate was recovered from solution and identified to be the dihydrazide of succinic acid. The mono and dihydrazide of other dibasic acids as well as the monohydrazides of monobasic acids can be prepared in a manner similar to that disclosed hereinabove for succinic acid.

Another class of compounds suitable as auxiliary accelerators for vulcanization of EPDM elastomers in accordance with the methods and compositions of the present invention can be defined as having the general structural formula

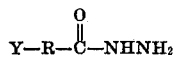

wherein Y is selected from

and hydrogen and R is selected from a divalent $C_5$ to $C_{40}$ cyclic hydrocarbon radical. In this instance wherein Y is hydrogen, monohydrazide compounds suitable for use include:
Cyclopentane carboxylic acid hydrazide
Cyclooctane carboxylic acid hydrazide
2,3,5-trimethylcyclohexane carboxylic acid hydrazide
cyclodecane carboxylic acid hydrazide
cyclohexane carboxylic acid hydrazide
1-(p-hexahydrobenzoic acid hydrazide)-2-(3-cyclohexylethane)
3,3¹-dicyclohexyl-4-carboxylic acid hydrazide bicyclopentyl
In the instance wherein Y is

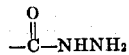

the dihydrazide compounds suitable for use in the present invention can include:
1,2-cyclopropane dicarboxylic acid dihydrazide
1,4-cyclohexane dicarboxylic acid dihydrazide
1,5-cyclooctane dicarboxylic acid dihydrazide
1,7-octadecahydrochrysene dicarboxylic acid dihydrazide
1,4-tetrahydronaphthlene dicarboxylic acid dihydrazide
Bicyclopentyl 3,3'-[bis(4-cyclohexyl-dicarboxylic acid dihydrazide)]
1,3-cyclopentyl dicarboxylic acid dihydrazide
1,4-cyclohexane dicarboxylic acid dihydrazide
Hexacosane a - di(4-cyclohexane dicarboxylic acid dihydrazide)
Bicyclopentyl-3,3'-dicyclohexyl-4,4'-dicarboxylic acid dihydrazide
Sexicyclopentyl-3,'''''-dicarboxylic acid dihydrazide Another class of hydrazide compounds suitable for use as auxiliary accelerators in vulcanizing EPDM elastomer compositions can be defined as having the general structural formula

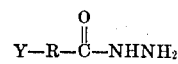

wherein Y can be

or hydrogen and R is a $C_2$ to $C_{40}$ divalent alkenyl hydrocarbon radical. In the instance wherein Y is hydrogen, the monohydrazides suitable for use in the present invention include:
Acrylic acid hydrazide
Sorbic acid hydrazide
4-pentenoic acid hydrazide
$\Delta^9$-decylenic acid hydrazide
Oleic acid hydrazide
Gadoleic acid hydrazide
$\Delta^{29}$-triacontenic acid hydrazide
$\Delta^{39}$-tetraconteric acid hydrazide
In the instance wherein Y is

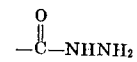

dihydrazide compounds suitable for use in the instant invention include:
2-pentene-1,5-dioic acid dihydrazide
Maleic acid dihydrazide
$\alpha,\alpha'$-dimethylmuconic acid dihydrazide
$\alpha$-methylmuconic acid dihydrazide
$\beta$-methylmuconic acid dihydrazide
$\alpha,\beta'$-dimethylmuconic acid dihydrazide
$\alpha,\alpha',\beta$-trimethylmyconic acid dihydrazide
$\alpha,\beta,\beta'$-trimethylmuconic acid dihydrazide
$\alpha,\alpha',\beta,\beta'$-tetramethylmuconic acid dihydrazide
2,4,6,8-decatetraene-1,10-dioic acid dihydrazide
3,4-diisopropyl-2,4-hexadiene-1,6-dioic acid dihydrazide
2,6,11,15-tetramethyl-2,6,10,14-hexadecatetraene 1,20-dioic acid hydrazide
9-heneicosene-1,21dioic acid dihydrazide
2,6,10,15,19,23-hexamethyl-2,6,10,14,18,22-tetracosahexene-1,24-dioic acid dihydrazide
2-tetratriacontene-1,34-dioic acid dihydrazide
2,6,10,14,19,23,27,31-octamethyl-2,6,10,14,18,22,26,30-dotriacontaoctaene dioic acid dihydrazide Each of the above disclosed mono and dihydrazide compounds are effective auxiliary accelerators for vulcanizing ethylene-propylene-diene elastomer compositions.

Another class of hydrazide compounds suitable for use as auxiliary accelerators in vulcanizing EPDM elastomeric compositions can be defined by the structural formula

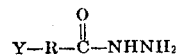

wherein Y can be

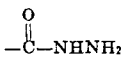

or hydrogen and R is a $C_6$ to $C_{40}$ divalent aryl hydrocarbon radical. In the instance wherein Y is hydrogen, monohydrazide compounds suitable for use in the methods and compositions of the present invention can include:

Benzoic acid hydrazide
3,4-dimethyl benzoic acid hydrazide
3,4,5-trimethyl benzoic acid hydrazide
2,3,4,5,6-pentamethylbenzoic acid hydrazide
9-phenyl antracene-10-carboxylic hydrazide
1-(4-biphenyl)-4-naphthoic acid hydrazide
1-(4-benzoic acid hydrazide)-tricosane
1-(4-benzoic acid hydrazide) heptacosane
1-(4-benzoic acid hydrazide) tritriacontane Compounds in which Y is

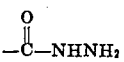

and R is a $C_6$ to $C_{40}$ divalent aryl hydrocarbon radical, compounds suitable for use can include:

Terephthalic acid dihydrazide
5-methyl isophthalic acid dihydrazide
4,6-dimethyl isophthalic acid dihydrazide
2,6-naphthalene dicarboxylic acid dihydrazide
1,1-binaphthyl-4,4'-dicarboxylic acid dihydrazide
Benzo (c) phenanthrene-3,11-dicarboxylic acid dihydrazide
Picene-1,7-dicarboxylic acid dihydrazide
1,1-(p-benzoic acid hydrazide) hexadecane
p-terephenyl-4,4'-dibenzoic acid hydrazide
1,1-(p-benzoic acid hydrazide) hexacosane The above disclosed aryl acid hydrazide compounds are effective as auxiliary accelerators in the sulfur vulcanization of EPDM synthetic elastomeric compositions when added thereto.

As one illustration of the methods and compositions of the present invention, the following example is herein presented. All parts and percentages unless otherwise stated are by weight. The following EPDM sulfur vulcanizable compositions of "NORDEL 1070," an ethylene-propylene-diene polymer commercially available, were prepared.

| | Parts by weight | | | | | | | |
|---|---|---|---|---|---|---|---|---|
| | A | B | C | D | E | F | G | H |
| Nordel 1070 | 100 | 100 | 100 | 100 | 100 | 100 | 100 | 100 |
| Zinc oxide | 5.0 | 5.0 | 5.0 | 5.0 | 5.0 | 5.0 | 5.0 | 5.0 |
| HAF carbon black | 50.0 | 50.0 | 50.0 | 50.0 | 50.0 | 50.0 | 50.0 | 50.0 |
| TMTDS [1] | 1.5 | 1.5 | 1.5 | 1.5 | 1.5 | 1.5 | 1.5 | 1.5 |
| Rubber extending oil (ASTM D-2226) | 20.0 | 20.0 | 20.0 | 20.0 | 20.0 | 20.0 | 20.0 | 20.0 |
| MBT [2] | 0.2 | 0.2 | 0.2 | 0.2 | 0.2 | 0.2 | 0.2 | 0.2 |
| Sulfur | 1.5 | 1.5 | 1.5 | 1.5 | 1.5 | 1.5 | 1.5 | 1.5 |
| Acethydrazide | | 0.2 | | | | | | |
| Benzoic acid hydrazide | | | 0.2 | | | | | |
| Adipic acid dihydraxide | | | | 0.2 | | | | |
| Phthalic acid dihydrazide | | | | | 0.2 | | | |
| $\alpha,\alpha'$-Dimethylmuconic acid dihydrazide | | | | | | 0.2 | | |
| 2,6-dicarboxylic naphthalene dihydrazide | | | | | | | 0.2 | |
| MBT [2] | | | | | | | | 0.2 |

[1] Tetramethylthiuram disulfide.
[2] 2-Mercaptobenzothiazole.

| Example | Time to Optimum Cure | Tensil psi | 300% modulus | elongation | hardness |
|---|---|---|---|---|---|
| A-Control | 22 min. | 2750 | 1400 | 450 | 62 |
| B-Acethydrazide | 16 min. | 2700 | 1425 | 385 | 61 |
| C-Benzoic Acid Hydrazide | 15 min. | 2725 | 1375 | 405 | 61 |
| D-Adipic Acid Hydrazide | 16 min. | 2675 | 1400 | 390 | 60 |
| E-Phthalic Acid Hydrazide | 17 min. | 2750 | 1425 | 440 | 61 |
| F-$\alpha,\alpha'$-Dimethylmuconic Acid Dihydrazide | 19 min. | 2750 | 1365 | 450 | 60 |
| G-2,6-Dicarboxylic Naphthalene Dihydrazide | 18 min. | 2760 | 1410 | 455 | 60 |
| H-Added MBT | 21 min. | 2675 | 1325 | 460 | 60 |

Each of the above EPDM elastomer compositions were cured on a Monsanto Rheometer until the Mooney Viscosity reached a maximum tensil strength of about 2700 psi. The table above lists the length of time required for each of the compounds to reach this optimum cure at 320° F. The control as can be recognized required 23 minutes of curing time in order to achieve the maximum cure. With addition of 0.2 parts MBT as shown in Example G, the cure time wax only shortened by 1 minute. However, the addition of 0.2 parts of the auxiliary accelerators of the compositions of the present invention substantially improved and lessened the time necessary for an EPDM elastomer of the type herein disclosed to reach maximum cure. A substantial improvement in the vulcanization of EPDM elastomers by the hydrazides of the mono and dibasic acids as herein disclosed is clearly demonstrated.

The EPDM compositions of the present invention can also include the other additives normally used in the preparation of rubber products from EPDM polymers. Fillers and extenders normally used are considered within the scope of the present invention. Fillers such as carbon black, oxides of metals, talcums, clay, calcium carbonate, among others, can be used within the compositions of the present invention. Extenders such as petroleum hydrocarbon oils of the kind generally classified in ASTM D-2226 are suitable for use in the compositions of the present invention.

The scope of the present invention is not limited to the specific examples herein above presented. Any of the well known ethylene-propylene-diene elastomers generally used and available in the art when combined with any of the herein above disclosed mono and dihydrazides of monobasic and dibasic organic acid provide substantially improved sulfur vulcanizable EPDM elastomer compositions.

The invention claimed is:

1. A improved sulfur vulcanizable ethylene-propylene-diene polymer composition having a substantially accelerated cure-rate consisting essentially of ethylene-propylene-diene polymer, sulfur and a vulcanization improving quantity of an auxiliary accelerator selected from the group of compounds having a structural formula

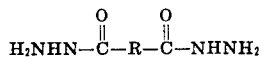

wherein R is selected from the group consisting of $C_1$ to $C_{40}$ aryl, alkyl, alkenyl and cyclic divalent hydrocarbon radicals or

wherein R is selected from the group consisting of $C_1$ to $C_{40}$ aryl, alkyl, alkenyl and cyclic monovalent hydrocarbon radicals.

2. A composition according to claim 1 wherein the vulcanization improving compound is the dihydrazide of succinic acid.

3. A composition according to claim 1 wherein the vulcanization improving compound is the dihydrazide of adipic acid.

4. A composition according to claim 1 wherein R is aliphatic.

5. A composition according to claim 4 wherein the the vulcanization improving compound is acethydrazide.

6. A composition according to claim 1 wherein R is aromatic.

7. A composition according to claim 6 wherein the vulcanization improving compound is the hydrazide of benzoic acid.

8. A composition according to claim 1 wherein the polymer is ethylene-propylene-1,4-hexadiene.

9. In the process of vulcanizing sulfur-vulcanizable ethylene-propylene-diene polymer which comprises mixing ethylene-propylene-diene polymer with a sulfur containing vulcanizing agent, the improvement which comprises improving the cure-rate of the composition by adding to the composition prior to heating a vulcanization improving quantity of an auxiliary accelerator selected from the group of compounds having a structural formula

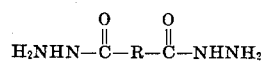

wherein R is selected from the group consisting of $C_1$ to $C_{40}$ aryl, alkyl, alkenyl and cyclic divalent hydrocarbon radicals or

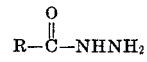

wherein R is selected from the group consisting of $C_1$ to $C_{40}$ aryl, alkyl, alkenyl and cyclic monovalent hydrocarbon radicals.

10. A method according to claim 9 wherein in polymer is ethylene-propylene-1,4-hexadiene.

11. A process according to claim 9 wherein the auxiliary accelerator is acethydrazide.

12. A process according to claim 9 wherein the auxiliary accelerator is benzoic acid hydrazide.

13. A process according to claim 9 wherein the auxiliary accelerator is adipic acid dihydrazide.

14. A process according to claim 9 wherein the auxiliary accelerator is phthalic acid dihydrazide.

* * * * *